Jan. 17, 1928. 1,656,583
J. HASTREITER
WIRE GLASS MACHINE
Filed March 15, 1927   3 Sheets-Sheet 1
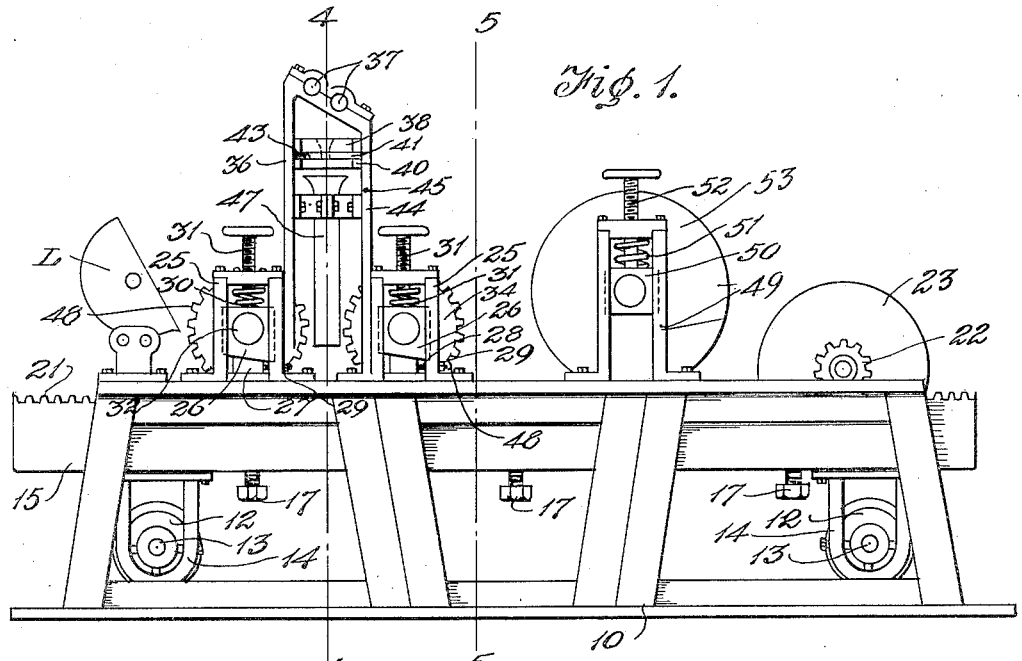
Fig. 1.
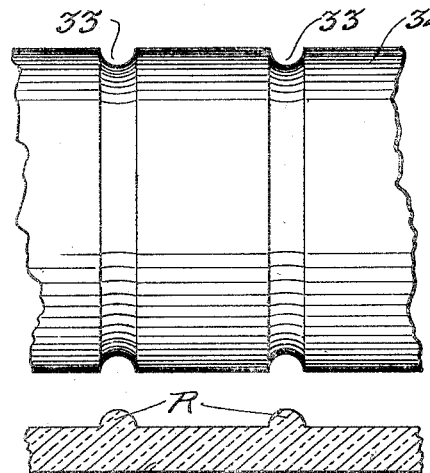
Fig. 2.
Fig. 2A.
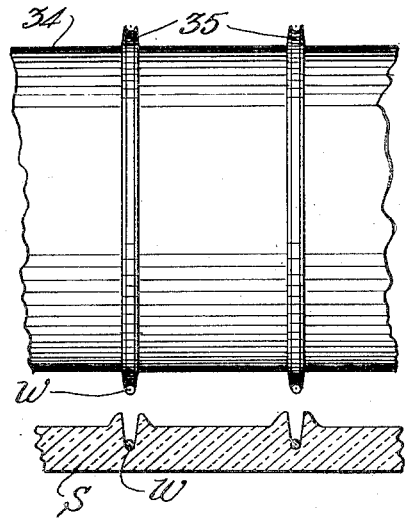
Fig. 3.
Fig. 3A.
INVENTOR.
Joseph Hastreiter,
BY L. N. Gillis
ATTORNEYS.

Jan. 17, 1928. 1,656,583
J. HASTREITER
WIRE GLASS MACHINE
Filed March 15, 1927   3 Sheets-Sheet 2

INVENTOR.
Joseph Hastreiter,
BY L. N. Gillis
ATTORNEYS.

Jan. 17, 1928.  1,656,583
J. HASTREITER
WIRE GLASS MACHINE
Filed March 15, 1927   3 Sheets-Sheet 3
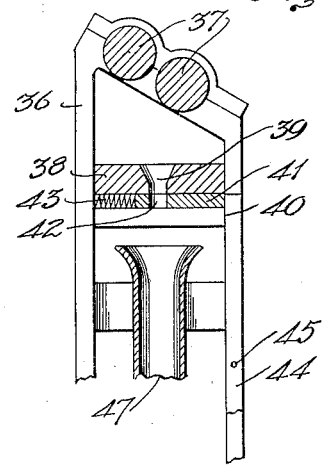
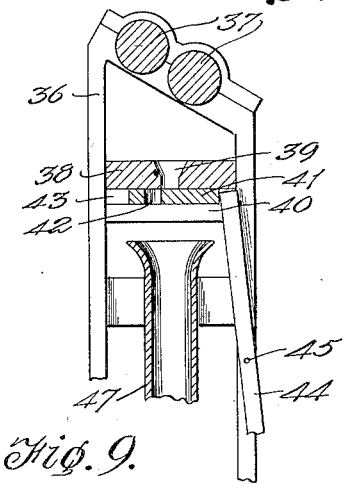
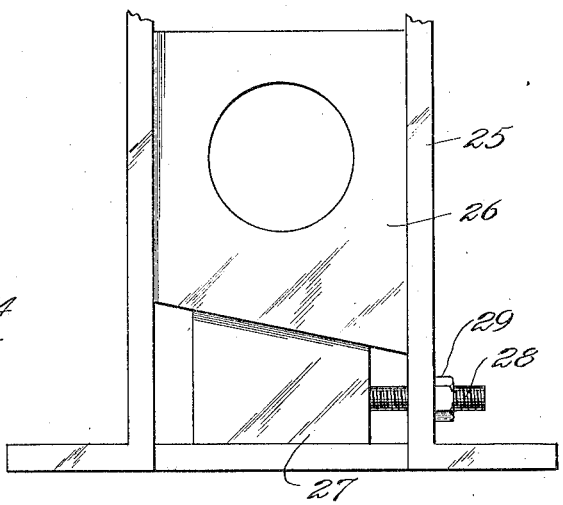
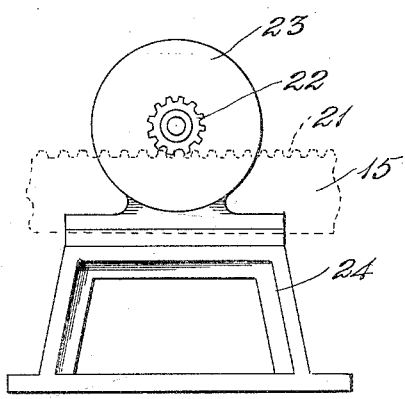
INVENTOR.
Joseph Hastreiter,
BY L. N. Gillis
ATTORNEYS.

Patented Jan. 17, 1928.

1,656,583

UNITED STATES PATENT OFFICE.

JOSEPH HASTREITER, OF MORGANTOWN, WEST VIRGINIA.

WIRE-GLASS MACHINE.

Application filed March 15, 1927. Serial No. 175,550.

This invention relates to the manufacture of glass and has special reference to a machine for making the so-called wire glass wherein wire is embedded in the glass to prevent the accidental breaking thereof.

One important object of the invention is to improve the general construction of machines of this character.

A second important object of the invention is to provide an improved arrangement of pressing rolls in machines of this character.

A third important object of the invention is to so arrange the pressing rolls in such a machine as to provide special thickness along the lines where the wire is inserted.

A fourth important object of the invention is to provide improved means for holding the wire during the forward movement of the traveling bed common in such machines.

A fifth important object of the invention is to provide improved means for cutting off the wire upon the completion of each sheet of glass.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a wire glass machine constructed in accordance with this invention.

Figure 2 is an enlarged detail view of a roll used for forming ribs in the glass sheet.

Figure 2ª is a section through the glass after passing the first roller.

Figure 3 is an enlarged detail view of a roll used for forcing the wire into the ribs of the glass sheet.

Figure 3ª is a section through the glass after passing the second roller.

Figure 4:
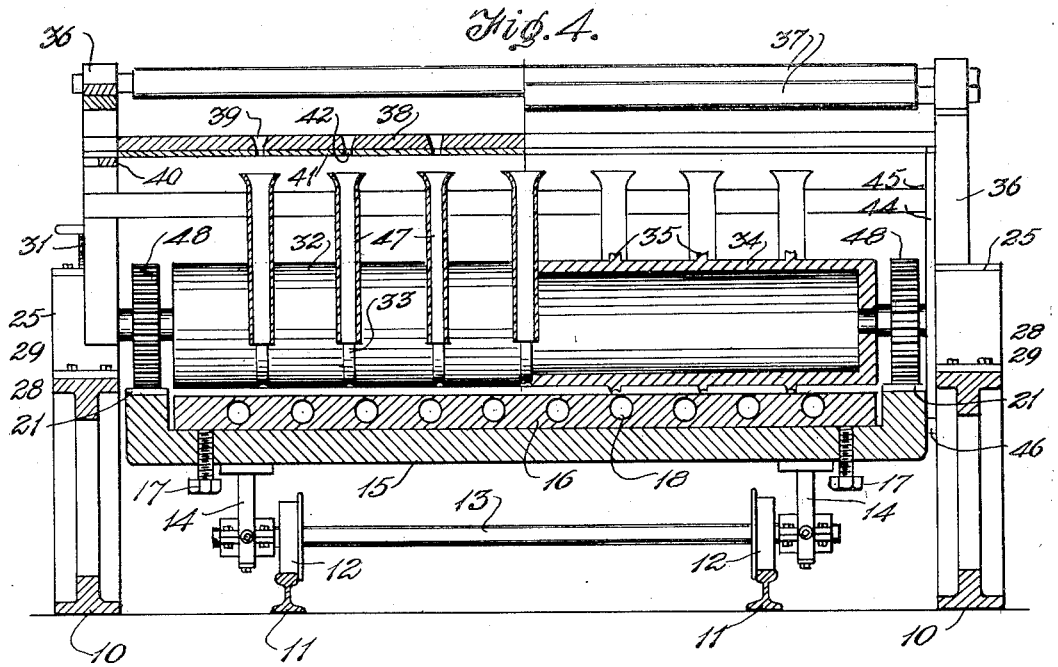

Figure 4 is a section one half on the line 4—4 of Figure 1 and the other half on the line 5—5 of Figure 1 but with the roll shown in section.

Figure 5:
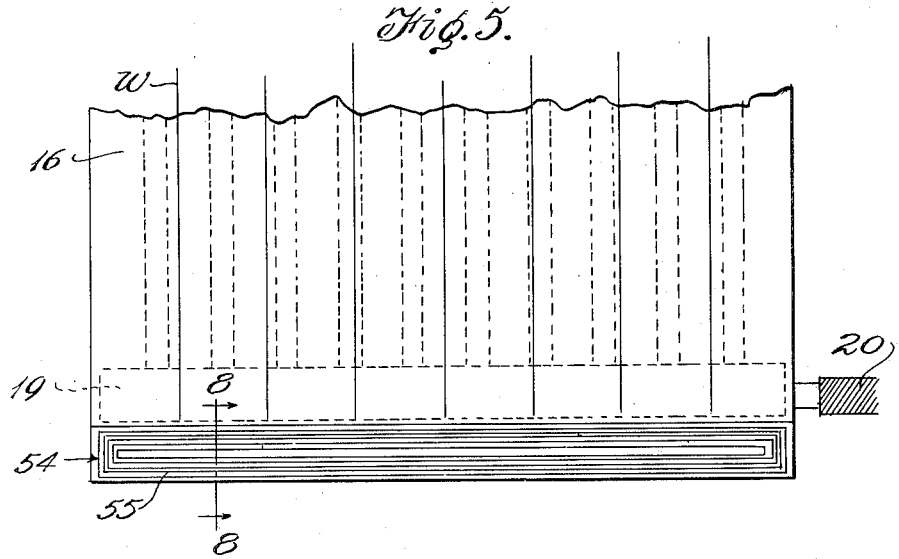

Figure 5 is a view in plan of one end of the table showing the magnet arrangement.

Figure 6 is an enlarged detail view of the upper part of one of the stands and showing the shears in section and in position to allow the wire to run through.

Figure 7 is a view similar to Figure 6 but showing the shears in cutting off position.

Figure 8 is an enlarged detail view on the line 8—8 of Figure 5.

Figure 9 is an enlarged detail view showing one manner of adjusting the roll bearings.

Figure 10 is an enlarged detail showing the motor drive for the invention.

In the embodiment of the invention here shown there is provided a pair of side frames 10 which are preferably made in sections secured together though these side frames may be made integral if desired. Between these side frames is arranged a pair of rails 11 whereon run track wheels 12 carrying an axle 13 which is journaled in hanger bearings 14 supported from the underside of a carriage 15. This carriage is of general trough shape and seated in the trough of the carriage is a bed plate 16 which is adjustable for height by the adjusting screws 17. This bed plate is provided with a series of longitudinal passages 18 communicating at each end with a header 19 so that connections 20 may be made for cooling water. Thus the water is admitted at one end of the bed plate and drawn off at the other.

At each side of the carriage body is a rack 21 and one of these racks is engaged by a gear 22 on a reversible motor 23 supported on a base 24. By this means the bed plate and carriage are driven to and fro on the rails 11. On each of the frames 10 there is provided a pair of bearing stands 25 wherein are mounted vertically slidable bearing boxes 26 which may be adjusted for height by means of the wedges 27 carrying screws 28 each of which extends through a respective stand and has on it a nut 29, movement of the nut drawing the wedge in one direction or permitting it to move in the opposite direction. Also, on top of each box is a spring 30 the tension of which is adjusted by a regulating screw 31 provided with the usual hand wheel. The bearings on one side of the machine are arranged opposite the bearings and in one set of these bearings is journaled a cylinder 32 having a spaced series of grooves 33 extending there around. In the other set of bearings there is a cylinder 34 journaled and this cylinder is provided with a spaced series of ribs 35 corresponding in spacing and position with the grooves 33. The outer edge of each rib 35 is grooved to engage the wire W. At each side of the machine the bearing stands support a vertical frame 36 and at the top of this frame is journaled a pair of rollers 37 between which the wires are fed from one or more reels of wire, not shown. Beneath the rolls 37 is a fixed shear plate 38 having therein inverted frusto-conical openings 39 which are spaced to lie in the planes of the grooves 33 and ribs 35. The frame 36 also supports cross bars 40 whereon rests a movable shear blade 41 having openings 42 therein which normally register with the openings 39 in the plate 38. Springs 43 normally hold the movable plate in position for this alinement by a lever 44 pivoted as at 45 which extends down along side of the carriage so that when the carriage is at the end of its movement this lever is engaged by a lug 46 and rocked on the pivot to move the blade 41 and thus cut off the wires which are fed downward between the rolls 37. Below the shear the frame 36 supports guide tubes 47 which extend down close to the bed 16 so that the wires are conducted to their proper positions. Each of the rolls 32 and 34 is provided on each end with a gear 48 which meshes with the respective rack 21 so that as the bed is reciprocated the rolls will rotate and it is to be noted that the gears and rolls are so proportioned that no slipping of the wire or glass occurs during the movement of the bed.

It will be seen that there has been here shown a very few of the guide tubes and shear openings but it is intended that these tubes and openings shall be spaced about two inches, center to center, and that the rolls shall be about seventy-two inches long though I am not confined to these dimensions. However, for clearness in illustration the tubes have been reduced in number and shown as of larger size, in proportion to the other parts, than is actually intended. I may, therefore, use as many tubes as I desire and also can space them to obtain the most efficient results.

Toward the delivery end of the machine there is a further pair of bearing stands 49 supporting bearings 50 pressed downward by springs 51 having their tension regulated by hand screws 52. In the bearing 50 is journaled a flattened roll 53.

At one end of the carriage there is a recess 54 wherein is mounted an electro-magnet 55 the core of which extends from one side of the bed to the other and is about level with the top of the bed though it may be a little below. At any rate, it is not in position to be engaged by the hot glass. This electro-magnet has its winding connected to form a suitable source of energy, not shown, and is so wound that it is sufficiently strong to hold the wires W when they are fed down and rest thereon.

A suitable ladle L is provided at the receiving end of the machine for pouring the glass onto the table.

In operation the hot plastic glass is poured on the table and the motor started. The glass then is rolled out by the roll 32 into a sheet S having ribs R and as it passes beneath the guide tubes the wires, which have been engaged by the magnet, rest on these ribs so that as the sheet S passes beneath the roll 34 the ribs 35 engage these wires and force them into the glass as shown in Figure 3ª. The glass then passes beneath the roll 53 and the grooves made by the ribs 35 are closed by the action of this roll. When the bed has moved to nearly the end of its stroke the wires are cut off and upon completion of the sheet it may be removed in the usual manner.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a wire glass machine, means for primarily flattening a mass of plastic glass into a sheet having raised ribs, other means for producing a groove in each rib and forcing a wire into the groove, and finishing means for flattening the sheet and closing the groove sides over the wire.

2. In a wire glass machine, a reciprocable table to receive a mass of plastic glass, a roll above said table having circumferential grooves and positioned to flatten the mass and form longitudinal ribs therein, a second roll having circumferential ribs positioned to open the ribs in the glass and peripherally grooved to hold wires for insertion in the grooves formed in the glass ribs, and a flattening roll for the glass after it has passed the second roll.

3. In a wire glass machine, a reciprocable table to receive a mass of plastic glass, a roll above said table having circumferential grooves and positioned to flatten the mass and form longitudinal ribs therein, a second roll having circumferential ribs positioned to open the ribs in the glass and peripherally grooved to hold wires for insertion in the grooves formed in the glass ribs, a flattening roll for the glass after it has passed the second roll, and means to guide wires into the grooves on the ribs of the second roll.

4. In a wire glass machine, a reciprocable table to receive a mass of plastic glass, a roll above said table having circumferential grooves and positioned to flatten the mass and form longitudinal ribs therein, a second roll having circumferential ribs positioned to open the ribs in the glass and peripherally grooved to hold wires for insertion in the grooves formed in the glass ribs, a flattening roll for the glass after it has passed the second roll, means to guide wires into the grooves on the ribs of the second roll, and means operated by the movement of the table for cutting off the wires as the table reaches a position adjacent the forward end of its movement.

5. In a wire glass machine, a reciprocable table to receive a mass of plastic glass, a roll above said table having circumferential grooves and positioned to flatten the mass and form longitudinal ribs therein, a second roll having circumferential ribs positioned to open the ribs in the glass and peripherally grooved to hold wires for insertion in the grooves formed in the glass ribs, a flattening roll for the glass after it has passed the second roll, means to guide wires into the grooves on the ribs of the second roll, means operated by the movement of the table for cutting off the wires as the table reaches a position adjacent the forward end of its movement, and means at the forward end of the table for holding the wires to cause them to feed forwardly with the table.

6. In a wire glass machine, a reciprocable table to receive a mass of plastic glass, a roll above said table having circumferential grooves and positioned to flatten the mass and form longitudinal ribs therein, a second roll having circumferential ribs positioned to open the ribs in the glass and peripherally grooved to hold wires for insertion in the grooves formed in the glass ribs, a flattening roll for the glass after it has passed the second roll, means to guide wires into the grooves on the ribs of the second roll, means operated by the movement of the table for cutting off the wires as the table reaches a position adjacent the forward end of its movement, and an electro-magnet at the forward end of the table for holding the wires to cause them to feed forwardly with the table.

In testimony whereof I affix my signature.

JOSEPH HASTREITER.